United States Patent
Beskrovny et al.

(10) Patent No.: US 8,645,984 B1
(45) Date of Patent: Feb. 4, 2014

(54) METHOD AND SYSTEM FOR VERIFYING CONTENT AUTHENTICITY IN SMART TV

(71) Applicant: Samsung Electronics Co., Ltd., Gyeonggi-do (KR)

(72) Inventors: Evgeny Beskrovny, Ramat Gan (IL); Iris Lev Ari, Ramat-Hasharon (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/759,082

(22) Filed: Feb. 5, 2013

(51) Int. Cl.
*H04H 60/33* (2008.01)
*H04N 21/44* (2011.01)
*H04N 21/434* (2011.01)
*H04N 21/43* (2011.01)

(52) U.S. Cl.
CPC ....... *H04N 21/44008* (2013.01); *H04N 21/434* (2013.01); *H04N 21/43* (2013.01); *H04N 21/44* (2013.01)
USPC ................................................ 725/9; 725/22

(58) Field of Classification Search
CPC .................. H04N 21/43; H04N 21/44; H04N 21/440088; H04N 21/434
USPC ............................................ 725/22, 48, 51, 9
See application file for complete search history.

(56) References Cited

U.S. PATENT DOCUMENTS

| | | | | |
|---|---|---|---|---|
| 3,919,479 A * | 11/1975 | Moon et al. | | 704/237 |
| 4,511,917 A * | 4/1985 | Kohler et al. | | 725/1 |
| 4,677,466 A * | 6/1987 | Lert et al. | | 725/22 |
| 4,739,398 A * | 4/1988 | Thomas et al. | | 725/22 |
| 5,621,793 A * | 4/1997 | Bednarek et al. | | 380/240 |
| 6,487,719 B1 * | 11/2002 | Itoh et al. | | 725/17 |
| 6,771,885 B1 * | 8/2004 | Agnihotri et al. | | 386/314 |
| 6,834,308 B1 * | 12/2004 | Ikezoye et al. | | 709/231 |
| 7,650,504 B2 * | 1/2010 | Bodrov | | 713/176 |
| 7,974,436 B2 * | 7/2011 | Brunk et al. | | 382/100 |
| 8,009,965 B2 * | 8/2011 | Takao | | 386/249 |
| 2002/0026635 A1* | 2/2002 | Wheeler et al. | | 725/19 |
| 2003/0093789 A1* | 5/2003 | Zimmerman et al. | | 725/34 |
| 2008/0168514 A1* | 7/2008 | Jeon | | 725/110 |
| 2008/0244675 A1* | 10/2008 | Sako et al. | | 725/114 |
| 2010/0017627 A1* | 1/2010 | Princen et al. | | 713/193 |

* cited by examiner

*Primary Examiner* — Pankaj Kumar
*Assistant Examiner* — Timothy Newlin
(74) *Attorney, Agent, or Firm* — Roach, Brown, McCarthy & Gruber, P.C.; Kevin D McCarthy

(57) ABSTRACT

A system for determining the authenticity of a received channel via an Internet port of a smart TV having (a) a first streamer for receiving a channel A via said Internet port, and forwarding a respective video stream of the channel to a synchronizer; (b) a second streamer for receiving a same channel A via a traditional port, and forwarding a respective video stream of the channel to said synchronizer; (c) said synchronizer synchronizing between the two streams, and outputting the two synchronized streams respectively to a correlator; and (d) said correlator correlating between corresponding frames of the stream, and when a similarity above a predefined threshold is determined, declaring channel A as received via the Internet port as authentic; otherwise, if a similarity below a predefined threshold is determined, declaring by the correlator that channel A as received via the Internet port is non-authentic.

8 Claims, 2 Drawing Sheets

METHOD AND SYSTEM FOR VERIFYING CONTENT AUTHENTICITY IN SMART TV

FIELD OF THE INVENTION

The invention relates to the field of content authenticity. More specifically, the invention relates to a method and system for verifying the authenticity of a watched content in a smart TV, and even more specifically, to verification of the authenticity of content which is provided through the Internet port of a smart TV.

BACKGROUND OF THE INVENTION

The smart TV standard has been designed to provide an enhanced experience to the viewer over the traditional TV. Typically, the smart TV includes two separate inputs: (a) a traditional TV port for receiving traditional TV channels from a TV content provider, e.g., cables or satellite provider (hereinafter, a "traditional mode watching"), and (b) an Internet port for receiving TV channels from the Internet (hereinafter, "Internet mode watching"). The viewer can select at any given time whether to view a channel through the traditional port or through the Internet port.

The Internet mode watching provides many enhanced options to the viewer not existing in the traditional mode. For example, the Internet mode enables the viewer the option of chatting with others while watching a TV channel, activation of a "picture in picture" in order to simultaneously watch several channels according to his preference, to combine Facebook and Twitter features with the TV content, to operate the TV without the use of set-top box, and more. As noted, the essence of the smart TV resides in the Internet TV mode, not in the traditional mode, and there are many advantages for the viewer in watching the smart TV in the Internet mode.

One typical way by which a user may access a TV channel in the Internet TV mode is by means of activation of a widget. In this case, the widget is essentially a user interface which accesses the channel provider, and activates the streaming of data to the smart TV. Widgets of specific channels can be purchased, for example in "Appstores", or in many other cases these widgets are distributed for free in various Internet sites.

While in the traditional mode of watching the viewer has a signed contract for a package of channels with a domestic, well known content provider, this is not the case while watching a channel in the Internet mode. Even when paying for a widget, the viewer does not know for sure who the real provider of the widget is, and therefore, the reliability of the streamed content is doubtful. In other words, the viewer may be subjected to a content spoofing while viewing content in the Internet mode. For example, a viewer who watches the Bloomberg channel for business purposes assumes that the share rates appearing on the screen of his TV are indeed the rates as provided by Bloomberg. While viewing the Bloomberg channel on a smart TV in the Internet mode, a content spoofing may deceive him to believe that he is watching the authentic Bloomberg channel, but in fact he watches a false channel which provides him with false data, that he may count on in his decision making.

Various manners for authenticating Internet sites are well known, and the field for providing said authentication is commonly referred to as DRM (Digital Right Management). The existing solutions to this problem may be classified to three groups: (a) certificate based solutions; (b) encryption based solutions; and (c) watermark based solutions. All said common solutions are relatively complicated, therefore most of the Internet mode content for smart TV is typically provided unencrypted, without watermarks, and does not use certificate, leaving the viewer uncertain with respect to the authenticity and reliability of the content. In view of this situation, a viewer who wants to ensure the reliability of the content, typically reverts to the traditional TV mode in which the same content is provided by the traditional TV provider, rather than watching the channel in the Internet mode. However, as noted above, the traditional mode does not provide many features that are available at the Internet mode.

U.S. Pat. No. 5,621,793 discloses a system with GPS, which in turn provides to a server means for determining whether a TV receiver is located in an area with permission to view a transmitted content, and in the affirmative case, the permission to view the content is granted.

US 2010-0017627 discloses a system for verifying content which is based on encryption, decryption and signature.

U.S. Pat. No. 7,650,504 discloses a system and method of verifying the authenticity of dynamically connectable executable images, which is based on a digital signature.

It is therefore an object of the present invention to provide a method and system for authenticating smart TV content, particularly but not exclusively, channels that are provided by means of widgets via the Internet.

It is another object of the invention to provide said method and system in a manner which is independent from the conventional authentication methods that use a certificate, encryption-decryption, and/or watermarks.

It is still another object of the invention to provide said method and system in a manner which is most suitable for smart TV, and which is efficient, reliable, and simple.

Other objects and advantages of the invention will become apparent as the description proceeds.

SUMMARY OF THE INVENTION

The invention relates to a system for determining the authenticity of a received channel via an Internet port of a smart TV, which comprises: (a) A first streamer for receiving a channel A via said Internet port, and forwarding a respective video stream of the channel to a synchronizer; (b) A second streamer for receiving a same channel A via a traditional port, and forwarding a respective video stream of the channel to said synchronizer; (c) Said synchronizer for receiving said Internet and traditional video streams, synchronizing between the two streams, and outputting the two synchronized Internet and traditional streams respectively to a correlator; and (d) Said correlator for receiving said two synchronized streams, correlating between corresponding frames of the stream, and when a similarity above a predefined threshold is determined, declaring channel A as received via the Internet port as authentic; otherwise, if a similarity below a predefined threshold is determined, declaring by the correlator that channel A as received via the Internet port is non-authentic.

Preferably, channel A is received from the Internet via the Internet port by means of activation of a widget.

Preferably, channel A as received from the traditional port is conveyed from a traditional TV provider.

Preferably, said correlator further comprises a unit for detecting non-original added matter in said two streams, and for notifying the correlator to ignore respectively locations of said added matter, while correlating between the two streams.

Preferably, said non-original added matter are symbols or advertisements appearing in frames of the two channel A streams.

The invention also relates to a method for determining authenticity of a received channel via an Internet port of a smart TV, which comprises the steps of: (a) receiving a channel A via the Internet port; (b) receiving a same channel A via a traditional port; (c) synchronizing between a stream channel A as received from the Internet port and between the stream of channel A as received from the traditional port; and (d) correlating between said synchronized two streams for checking similarity, and when determining a similarity above a predefined threshold, declaring channel A as received via the Internet port as authentic; otherwise, when determining a similarity below a predefined threshold, declaring channel A as received via the Internet port as non-authentic.

Preferably, channel A as received via the Internet port is received at the smart TV from the internet by means of activation of a widget.

Preferably, channel A as received from the traditional port is conveyed by a traditional TV provider.

Preferably, the method further comprises a step of detecting non-original added matter in frames of said two streams, and notifying the correlator to ignore respectively locations of said added matter when correlating between frames of the two streams.

Preferably, said non-original added matter are symbols or advertisements appearing within or between frames of the two streams.

DETAILED DESCRIPTION OF PREFERRED EMBODIMENTS

Figure 1:
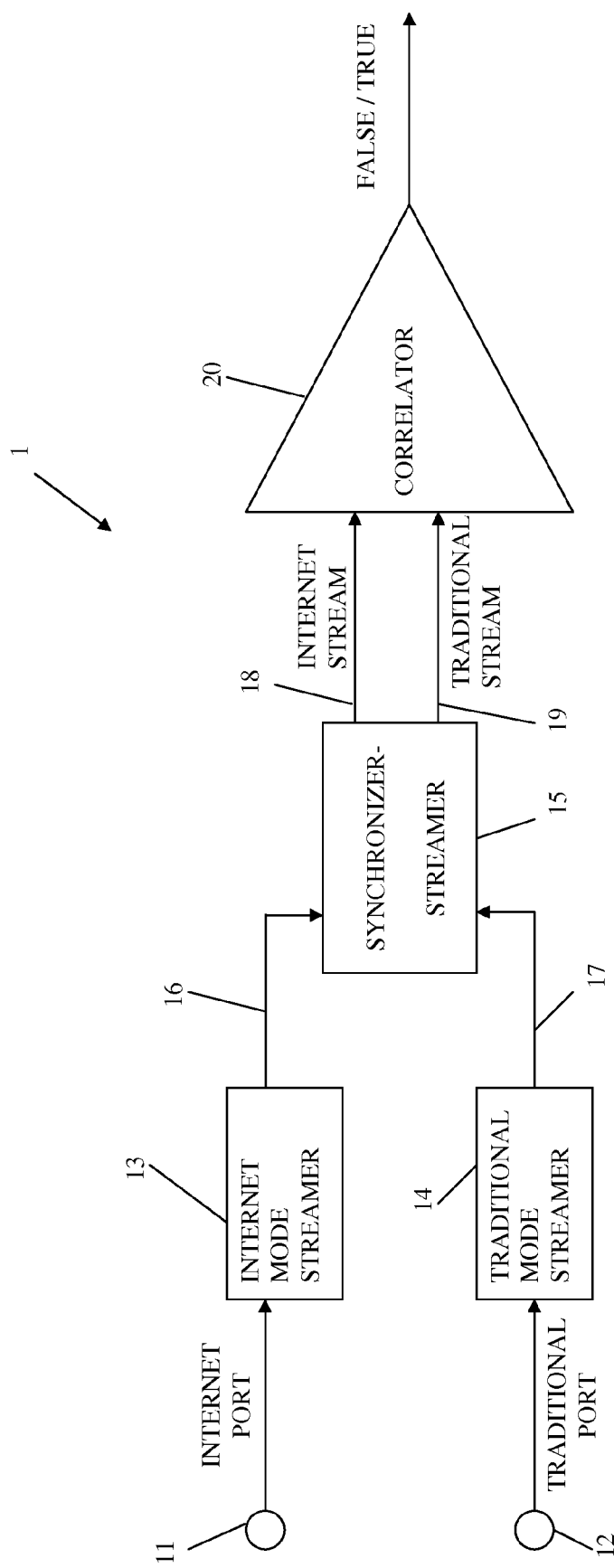
FIG. 1 illustrates in block diagram form the structure of a system for authenticating TV channels while operating in the Internet mode, according to the present invention.

FIG. 1 illustrates in block diagram form the structure of a system for authenticating TV channels while operating in the Internet mode, according to an embodiment of the present invention. As previously noted, a typical smart TV comprises two separate ports, as follows: (a) an Internet port 11 connected to the Internet, through which TV channels are received, typically while using a widget; and (b) a traditional port 12 which is connected to a traditional TV provider, through which TV transmissions are received in the conventional manner. In some cases, the traditional TV provider and the Internet provider are the same entity, and in some cases even a same TV port is used for serving these two functionalities, however, for the purpose of simplicity this description assumes two separate entities and ports. As noted, the TV is typically physically connected to both inputs, while the user can select between viewing in the Internet mode or in the traditional mode. The TV is also commonly provided with two streamers, Internet mode streamer 13 and traditional mode streamer 14 respectively, that stream the selected received video to the TV screen. In some cases, only one common streamer is used, which is selectively connected to the selected port, but this description assumes the existence of two separate streamers. According to the present invention, in order to authenticate the received channel in the Internet mode, the TV is activated to receive two separate streams of a same channel through the two separate ports respectively. Assuming that this is indeed a same authentic channel coming from two different sources, the two streams 16 and 17 respectively, coming from streamers 13 and 14 contain a same content, but they are unsynchronized. Streams 16 and 17 are provided into a synchronizer-streamer 15, which synchronizes streams 16 and 17, and outputs simultaneously the two synchronized streams, 18 and 19 respectively, to a correlator 20. Correlator 20 performs a frame by frame correlation between the Internet mode stream 18 of a channel as received in port 11 and the traditional mode stream 19 of a channel as received in port 12. As a selection is made by the viewer to watch a same channel, the synchronized streams are expected to be the same, besides some minor differences, therefore a resulted similarity below some predefined threshold level, when found, is considered as a sign for a false (i.e., non-authentic) channel. The threshold level may be defined, based on the desired sensitivity of the system, and on an expected rate of dissimilarity.

In invention as described above is based on the assumption that the channel as streamed by the traditional TV provider is authentic, an assumption which is in the vast majority of the cases, if not all, is true, as the traditional TV providers are typically subjected to strict regulations. It should also be noted that the contents coming from two separate ports (and providers) may include some provider-initiated added contents, such as symbols within the frames, advertisements, etc. Typically, there are known tools for determining the existence of such symbols and advertisements, such that they are ignored by the correlator 20, and do not affect the final correlator 20 decision. It should be noted that situations where the contents in ports 11 and 12 respectively are entirely different will be detected immediately, as already the synchronization by the synchronizer-streamer 15 will fail. However, there are cases in which the content spoofing is made such that the two compared stations look substantially the same, but with some differences, and such cases will be detected by the correlator 20.

Figure 2:
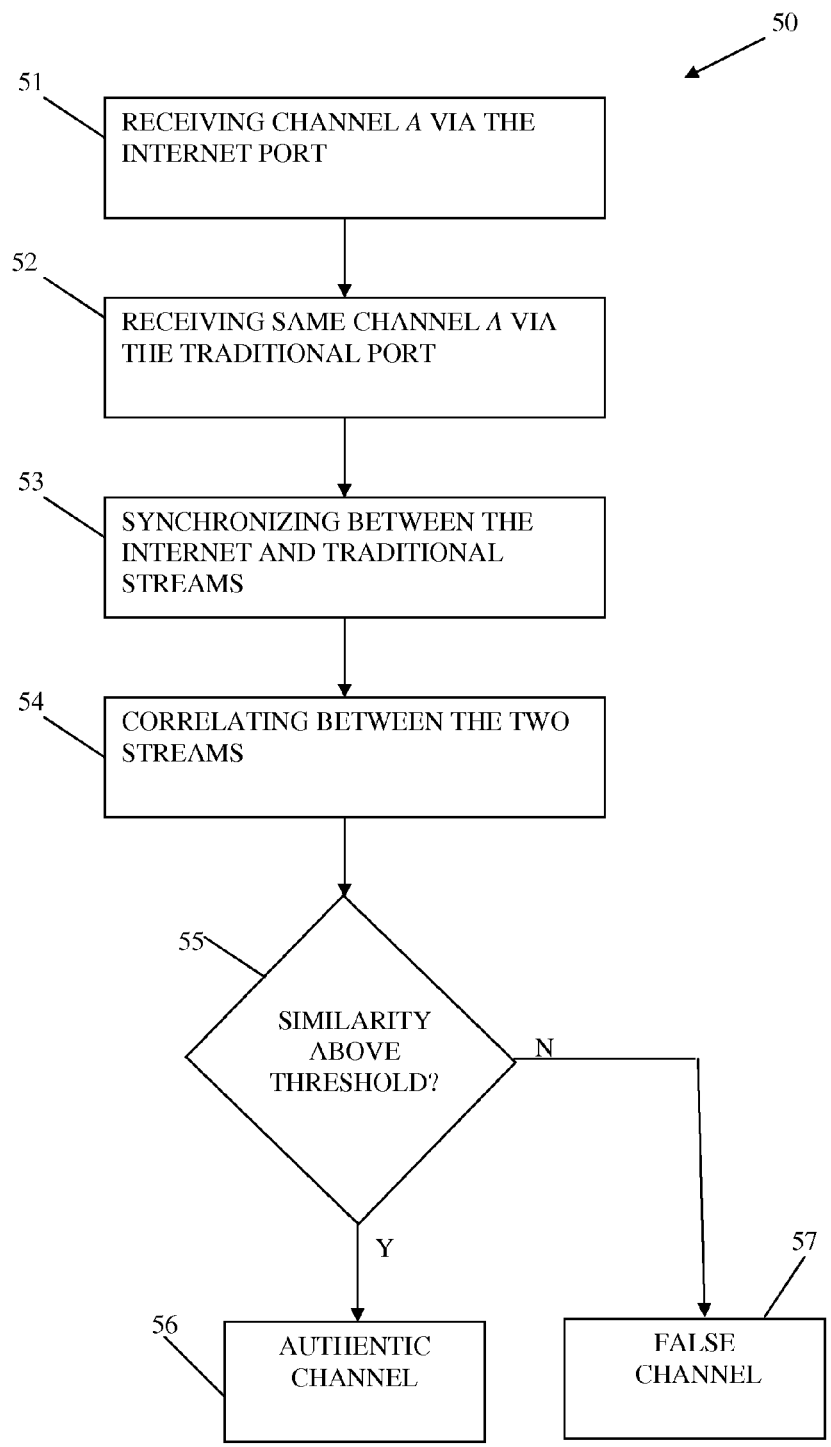
FIG. 2 illustrates in a flow diagram form a method for authenticating TV channels while operating in the Internet mode, according to an embodiment of the present invention.

The invention also relates to a method for determining the authenticity of a channel which is received via the Internet port of a smart TV. FIG. 2 illustrates in a flow diagram form a method 50 for authenticating TV channels when operating in the Internet mode, according to an embodiment of the present invention. In step 51a channel A is received via the Internet port, and in step 52 the same channel A is received via the traditional port of the smart TV. In step 53 the streams of the two channels are synchronized, and the two synchronized streams are provided in parallel into a correlating step 54. Correlating step 54 performs a frame to frame comparison between two simultaneous frames from said two synchronized streams, and if in step 55 the correlation finds similarity above a predefined threshold, the received channel A via the Internet port is declared as authentic in step 56. Otherwise, if no similarity above the threshold is found, the received channel A via the Internet port is declared as a false (non-authentic) channel.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. System for determining the authenticity of a channel received in a smart TV format via an Internet port of a smart TV, which comprises:

a) a first streamer for receiving via said Internet port a channel A as transmitted in a smart TV format, and forwarding a respective video stream of this smart TV format transmission to a synchronizer;

b) a second streamer for receiving via a traditional port a broadcast of a same channel A as transmitted by a provider in a traditional TV transmission format, and forwarding a respective video stream of this channel to said synchronizer;

c) said synchronizer for receiving said smart TV format video stream and said traditional TV format video stream, synchronizing between the two streams, and outputting the two synchronized smart TV format and traditional TV format streams respectively to a correlator; and d) said correlator for receiving said two synchronized streams, correlating between corresponding frames of the stream, and when a similarity above a predefined threshold is determined, declaring channel A as received via the Internet port as authentic; otherwise, if a similarity below a predefined threshold is determined, declaring by the correlator that channel A as received via the Internet port as non-authentic.

2. System according to claim 1, wherein channel A is received from the Internet via the Internet port by means of activation of a widget.

3. System according to claim 1, wherein channel A as received from the traditional TV port is conveyed from a traditional TV provider.

4. System according to claim 1, wherein said correlator further comprises a unit for detecting locations of symbols or advertisements appearing in frames of one or more of the two streams of channel A, and for notifying the correlator to ignore respectively said locations when correlating between frames of the two streams.

5. Method for determining authenticity of a received channel via an Internet port of a smart TV, which comprises the steps of:

a) receiving a channel A as transmitted in smart TV format via the Internet port;

b) receiving a same channel A as transmitted by a provider in a traditional TV transmission format via a traditional TV port;

c) synchronizing between a stream channel A as received from the Internet port and between the stream of channel A as received from the traditional TV port; and d) correlating between said synchronized two streams for checking similarity, and when determining a similarity above a predefined threshold, declaring channel A as received via the Internet port as authentic; otherwise, when determining a similarity below a predefined threshold, declaring channel A as received via the Internet port as non-authentic.

6. Method according to claim 5, wherein channel A as received via the Internet port is received at the smart TV from the internet by means of activation of a widget.

7. Method according to claim 5, wherein channel A as received from the traditional TV port is conveyed by a traditional TV provider.

8. Method according to claim 5, which further comprises a step of detecting locations of symbols or advertisements appearing in frames of one or more of the two streams of channel A, and notifying the correlator to ignore respectively said locations when correlating between frames of the two streams.

* * * * *